United States Patent
Melo et al.

(10) Patent No.: US 11,822,991 B2
(45) Date of Patent: Nov. 21, 2023

(54) RECYCLABLE RFID TRANSPONDER COMPONENTS AND PRODUCTION METHODS FOR SAME

(71) Applicant: Avery Dennison Retail Information Services LLC, Mentor, OH (US)

(72) Inventors: Francisco Duarte Barbosa Teixeira E Melo, Baiona (ES); Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/934,055

(22) Filed: Sep. 21, 2022

(65) Prior Publication Data

US 2023/0013517 A1 Jan. 19, 2023

Related U.S. Application Data

(62) Division of application No. 16/685,592, filed on Nov. 15, 2019, now Pat. No. 11,487,983.

(Continued)

(51) Int. Cl.
*G06K 19/077* (2006.01)
*G06K 7/10* (2006.01)
*H01Q 1/22* (2006.01)

(52) U.S. Cl.
CPC ... *G06K 19/07749* (2013.01); *G06K 7/10178* (2013.01); *G06K 7/10366* (2013.01);

(Continued)

(58) Field of Classification Search
CPC ......... G06K 19/07749; G06K 7/10178; G06K 7/10366; G06K 19/07718; H01Q 1/2225;

(Continued)

(56) References Cited

U.S. PATENT DOCUMENTS 7,452,748 B1 11/2008 Craig et al.
7,551,141 B1 6/2009 Hadley et al.
(Continued)

FOREIGN PATENT DOCUMENTS

| EP | 1031940 | 8/2000 |
|----|---------|--------|
| JP | 2004-287799 | 10/2004 |
| JP | 2005-310054 | 11/2005 |

OTHER PUBLICATIONS

International Preliminary Report on Patentability dated May 18, 2021 issued in corresponding IA No. PCT/US2019/061742.
(Continued)

*Primary Examiner* — Ryan W Sherwin

(57) ABSTRACT

Improved RFID devices and manufacturing methods that utilize more efficient RFID designs, result in less manufacturing material waste and increased recycling opportunities, all without sacrificing RFID device performance, are disclosed herein. Some exemplary embodiments of the improved RFID device may make use of a thinner foil, a hollowed-out foil, a "no-strip" design, or a tessellated design that may reduce material usage. Other exemplary embodiments may use a lower-impact and/or biodegradable adhesive so as to improve aluminum recycling and lessen risks to the environment.

10 Claims, 4 Drawing Sheets

Related U.S. Application Data

(60) Provisional application No. 62/768,080, filed on Nov. 15, 2018.

(52) U.S. Cl.
CPC . *G06K 19/07718* (2013.01); *G06K 19/07779* (2013.01); *H01Q 1/2225* (2013.01)

(58) Field of Classification Search
CPC . H01Q 1/38; H01Q 7/00; H01Q 21/10; H04B 5/0075
See application file for complete search history.

(56) References Cited

U.S. PATENT DOCUMENTS

| | | | |
|---|---|---|---|
| 2004/0052203 A1* | 3/2004 | Brollier | G08B 13/2445 |
| 2004/0130500 A1 | 7/2004 | Takei | |
| 2004/0133484 A1 | 7/2004 | Kreiner et al. | |
| 2005/0179552 A1* | 8/2005 | Shoji | G06K 19/0726 |
| | | | 343/866 |
| 2005/0198811 A1* | 9/2005 | Kurz | H01Q 7/00 |
| | | | 29/601 |
| 2005/0206524 A1 | 9/2005 | Forster et al. | |
| 2006/0043199 A1 | 3/2006 | Baba et al. | |
| 2006/0080819 A1 | 4/2006 | McAllister | |
| 2006/0145860 A1 | 7/2006 | Brown et al. | |
| 2007/0040688 A1 | 2/2007 | Cocita et al. | |
| 2007/0094862 A1* | 5/2007 | Posamentier | G06K 19/07749 |
| | | | 29/601 |
| 2007/0238245 A1 | 10/2007 | Cote et al. | |
| 2008/0000986 A1 | 1/2008 | Onishi et al. | |
| 2008/0111694 A1* | 5/2008 | Yamagajo | H01Q 1/38 |
| | | | 29/601 |
| 2009/0230196 A1* | 9/2009 | Johnson | G06K 19/07749 |
| | | | 235/492 |
| 2010/0126000 A1* | 5/2010 | Forster | G06K 19/07749 |
| | | | 29/601 |
| 2010/0230500 A1* | 9/2010 | Wilkinson | G06K 19/07749 |
| | | | 235/492 |
| 2011/0031321 A1 | 2/2011 | Kline | |
| 2011/0060451 A1 | 3/2011 | Borowski et al. | |
| 2011/0073661 A1* | 3/2011 | Forster | G06K 19/07783 |
| | | | 235/492 |
| 2012/0118975 A1* | 5/2012 | Forster | H01Q 9/26 |
| | | | 716/132 |
| 2016/0342936 A1 | 11/2016 | Milum | |
| 2017/0225199 A1 | 8/2017 | Koistinen et al. | |
| 2017/0253891 A1 | 9/2017 | Gitschel | |
| 2019/0176163 A1 | 6/2019 | Valerio | |
| 2020/0302261 A1* | 9/2020 | Maeda | G06K 19/0723 |

OTHER PUBLICATIONS

International Search Report and Written Opinion dated Jun. 26, 2020 issued in corresponding IA No. PCT/US2019/061742.

* cited by examiner

RECYCLABLE RFID TRANSPONDER COMPONENTS AND PRODUCTION METHODS FOR SAME

CROSS REFERENCE TO RELATED APPLICATION

This application is a division of U.S. patent application Ser. No. 16/685,592, filed Nov. 15, 2019, and claims priority from U.S. Provisional Patent Application Ser. No. 62/768,080 filed on Nov. 15, 2018, both which are incorporated herein by entirety.

BACKGROUND

The present invention relates generally to radio frequency identification (RFID) devices, and their methods of manufacture. More specifically, the RFID devices and manufacturing methods disclosed herein utilize more efficient RFID device designs, result in less manufacturing material waste and increased recycling opportunities, all without sacrificing RFID device performance. Accordingly, the present specification makes specific reference thereto. However, it is to be appreciated that aspects of the present invention are also equally amenable to other like applications, devices and methods of manufacture.

Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track. In some cases, the RFID tag may be attached to the outside of the article with a clip, adhesive, tape, or other means and, in other cases, the RFID tag may be inserted within the article, such as being included in the packaging, located within the container of the article or plurality of articles, or sewn into a garment. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database.

These RFID devices generally include a combination of antennas and analog and/or digital electronics, such as communications electronics, data memory, and control logic, as well as structures to support and protect the antennas and electronics, and to mount or attach the same to an object. RFID labels are RFID devices that are adhesively attached to an object as part of a printed label with printed matter on one side, or are otherwise attached directly to said objects. By comparison, RFID tags are more substantial devices that are typically attached to an object by the use of a plastic fastener, a string or cord, or which are otherwise fastened in some manner to the object.

All RFID devices are typically designed with certain parameters in mind. For example, in most applications, the size and the shape (that is, the form factor) of the RFID device is crucial, as are other properties such as the flexibility of the device. For various reasons, such as security, aesthetics, manufacturing efficiency, and so forth, there is a very strong tendency on the part of RFID manufacturers to make use of smaller form factors. As such, and because relatively thin profiles and flexibility are so commonly desired, it is important to avoid materials such as bulky electronics and RFID device constructions that add undue thickness or stiffness to the RFID tag or label.

RFID devices most commonly include, as primary components, a very small and flexible chip, and a flexible dipole antenna wrapped in a loop that has a physical length of approximately one-half wavelength of the RF device's operating frequency. The chips and the antennas may be linked with structures referred to as "straps," "interposers," and "carriers," to facilitate device manufacture. For purposes of discussion, said straps, interposers and carriers are hereinafter collectively referred to as "straps".

These straps may function as electrical interfaces for routing between a connection associated with the chip and a connection associated with the antenna. The straps may comprise conductive leads or pads that are electrically coupled to the contact pads of the chips for coupling to the antennas. These conductive leads or pads may be used to provide a larger effective electrical contact area than a chip precisely aligned for direct placement would have without the use of a strap or interposer. Having a larger effective electrical contact area reduces the accuracy required for placement of chips during manufacture, while still providing effective electrical connection between the antenna and the chip. The use of such a device can be extremely helpful during manufacturing, as chip placement and mounting are historic constraints for high-speed manufacturing, but can also result in more material being consumed during the manufacturing process, which increases manufacturing costs and is therefore undesirable.

Additionally, RFID tags and labels are seeing widespread and increased usage in a wide variety of industries that require an object to be associated with an identification code, and may be used in almost any industry and at any stage of production, both at micro-scales and macro-scales. For example, RFID tags can be paired with manufactured components, such as automotive components, in order to track their progress through the assembly line. RFID tags can also be paired with finished products in order to track the same through order fulfillment and/or during shipping, and in subsequent use. Also, RFID tags can be used in all sorts of service and entertainment industries, such as in smart passes for amusement parks or inside casino chips (such as "high-roller" chips), in order to better manage customers and to track customer spending. RFID tags can also be implanted into biological organisms, such as livestock and pets, in order to facilitate identification and/or tracking.

Consequently, as a whole, the RFID market is very substantial. For example, the total RFID market was estimated as being worth upwards of $11 billion as of 2017, and approximately 18.2 billion RFID tags were estimated to have been sold, with nearly half of that figure (i.e., 8.7 billion tags) being utilized with garments alone. Further, it is estimated that this represents only around 20% of the total market for garments, meaning that there is a significant amount of room for growth in the apparel industry. Likewise, over 800 million RFID tags were estimated to have been embedded in tickets used for transit, and over 400 million tags were embedded in animals such as livestock and pets.

Additionally, many of the above referenced applications only require that the RFID tag be used for a relatively short timeframe. After the timeframe expires, the RFID tag need not be maintained and can even be removed, if so desired. For example, if an RFID tag is used for tracking inventory and parcels, it can be removed from the inventory at some stage of the process (e.g., when a manufactured product is assembled), and can be removed from the parcel whenever the parcel has been shipped to its intended destination. Likewise, an RFID tag embedded in a ticket used for transit will likely be discarded whenever the recipient reaches the intended destination.

Because of the very large numbers of RFID tags that are manufactured and sold, even trivial manufacturing material savings or cost savings per RFID tag can have a very significant financial impact on the manufacturer. For example, even if a reduction in total mass used in manufacturing is only apparent at the per-million-tag level, it can still potentially be worthwhile to implement, because there may be significant numbers of cases where billions of one particular RFID tag are produced. Likewise, a significant amount of RFID material may be recycled following the manufacturing process under the right conditions. Therefore, due to the scales involved, even trivial improvements in the ease of recycling that slightly increase the percentage of recyclable material can be highly beneficial.

Significant cost savings can also be realized from other components of the RFID manufacturing process. For example, the manufacturing process for RFID labels typically involves an adhesive treatment. Therefore, a reduction in the costs associated with applying, handling and/or recycling the adhesive can be both substantial and highly beneficial. Likewise, reduction in the costs associated with fitting chips to RFID antennas can also result in significant cost savings to the manufacturer. Additionally, since many of the RFID tags and labels themselves will only be useful for a short time period, such as during a period when the tag or label is being shipped, it may also be possible to reclaim and recycle some of the used RFID tags or material from the same.

Therefore, there exists in the art a long felt need for more efficient RFID designs and methods of manufacture that result in the creation of less manufacturing waste. There is also a long felt need in the art for RFID designs and methods of manufacture that result in increased recycling opportunities. Finally, there is a long felt need in the art for RFID designs and methods of manufacture that achieve the stated objectives without sacrificing RFID device performance.

SUMMARY

A variety of improvements to various RFID components and their method of manufacture are described herein. The variety of improvements result in both the creation of less manufacturing waste and increased recycling opportunities, all without sacrificing RFID device performance.

According to an exemplary embodiment, an improved RFID device may be constructed so that it has a reduced total mass of material used in its construction (which may be, for example, aluminum or a similar metal or alloy), or such that a reduced mass of material is consumed in the manufacturing of the RFID device. This may reduce material costs associated with the manufacturing of the RFID device, or may reduce or offset manufacturing costs by permitting more effective and efficient recycling to be performed.

In one exemplary embodiment, an improvement to the RFID manufacturing process may be made by removing foil from the manufacturing process, or from the final RFID device, where it is not needed. For example, according to some exemplary embodiments, it may be determined, based on a current map of the RFID device, that there are areas in which removing conductors will have minimal impact on overall device performance. For example, an RFID antenna may be designed to have fewer of such areas or to have less material in such areas in order to decrease the amount of material consumed by the manufacturing process, and to increase the amount of material that may be recycled as part of production (in the factory) or immediately after production. In one exemplary embodiment, this reduction may be achieved by "hollowing out" the RFID antenna in order to remove conductive area in the center of the RFID antenna, where the removal of such conductive material will have the least impact on overall device performance. In another exemplary embodiment, a reduction in conductive area may be achieved, in a scenario in which some or all of the conductive area is printed in the form of a solution like silver ink, by reducing the amount of solution used.

A reduction in material consumed in the manufacturing process can also be achieved by better tailoring the printed RFID antennas to the material in question. More specifically, according to an exemplary embodiment, it may be desirable to form RFID antennas on a foil that does not require the use of a matrix strip placed between RFID antennas. For example, in one exemplary embodiment, a bar antenna (or an antenna analogous to a bar antenna) may be used. One such analogous antenna, which may hereinafter be referred to as a "no-strip" antenna, may resemble a bar antenna with a T-shape cut out of it and with zero pitch. The use of such an RFID antenna design may ensure that the vast majority of the foil (e.g., close to 100%) is converted to RFID antennas, and that the remainder of the foil can be cleanly recycled, all based on the elimination of the matrix strip. It will also be appreciated by those possessing ordinary skill in the art that the strap used to hold the RFID chip to the antenna may also be reclaimed, and, where possible, the RFID chip or silicone could also be recovered and/or recycled.

According to another exemplary embodiment of the present invention, an antenna type that is best tailored to the intended RFID device may be carefully chosen in order to reduce the amount of material used to manufacture each RFID device, while still keeping the RFID device at an acceptable level of performance. It will also be understood that RFID antennas may be prepared and manufactured in different shapes, as well as different types. In some exemplary embodiments, these shapes may vary by manufacturing run or by intended application, or be based upon any other criteria that suits user need and/or preference. For example, according to an exemplary embodiment, an RFID antenna may be prepared in a shape such that it tessellates more efficiently with other RFID antennas printed on the same sheet, such that more aluminum area can be used to make the RFID antennas, and less aluminum area is wasted. While square antennas are typically most common in the art, it may be noted that another shape, such as a triangle, hexagon, or other geometric or non-geometric shape, may tesselate more efficiently and, as such, said other shape or shapes may be utilized in place of a square shaped antenna in order to save on aluminum area and reduce waste.

In yet another exemplary embodiment, it may be desirable to have multiple different shapes and/or multiple different sizes of antennas prepared on a sheet so as to fully maximize space, and that an antenna sheet may be tiled with multiple different geometric shapes or multiple different sizes of geometric shapes (or both) in order to maximize spatial efficiency. These antenna shapes may, in some exemplary embodiments, be regular polygons, irregular polygons, or any other geometric or non-geometric shape to suit user preference and that may all be formed on the same sheet so as to increase efficiency and reduce waste. In some exemplary embodiments, it may be understood that, when a mix of RFID antennas are used, such as RFID antennas of different shapes or sizes, the RFID antennas may also be of different types. For example, in some exemplary embodiments, the RFID antennas may use different processes, such as direct and strap attach. For purposes of this disclosure, "direct attach" refers to direct attachment between the RFID antennas, while "strap attach" refers to attachment using a strap as described elsewhere herein.

According to another exemplary embodiment of the present invention, the thickness of the foil used in manufacturing RFID antennas may be varied. By way of example, an RFID antenna that is currently manufactured using a 15-micrometer foil may instead be reduced in thickness so as to use a much thinner foil, such as a 3-micrometer foil, such as is permissible. In some exemplary embodiments, the use of a thinner foil may be permissible due to skin depth effects. For example, the RFID signal received by the antenna may be distributed by the antenna such that the induced current density is largest near the surface of the RFID antenna, and decreases with greater depths in the conductor, with the depth being based on the conductor material. As such, even a foil that is substantially reduced in size may be capable of conducting a significant amount of current and receiving RFID signals. Other foils of different sizes, such as sizes smaller than 3 micrometers in thickness, may also be utilized, and the 3 micrometers reference should not be construed as a limitation.

Nonetheless, it should be understood that the use of a very thin foil may present other manufacturing challenges, specifically in the field of mechanical handling. For example, it may be impractical to try to deliver or distribute foils having thicknesses below those currently used in the art, and it may be even more impractical to try to use the same to fabricate very small parts because of the high potential of damaging those parts through improper mechanical handling. As such, the use of a thinner foil must be coupled with the introduction of a mechanism for handling the thinner foil and foil parts at such sizes. According to an exemplary embodiment, the thinner foil may be provided with a paper base in order to thicken the foil parts to allow for easier handling. For example, the foil may be prepared and provided in the form of a roll, with the paper backing running parallel to the foil, such that the parts can be removed from the foil along with the paper backing, and such that the paper backing may be removed once the parts have been applied.

Alternative backings and alternative methods of mechanically handling the thin foil of the RFID device are also contemplated. In some exemplary embodiments, the alternative backings and alternative methods of mechanically handling the thin foil may be used to significantly reduce the amount of aluminum that is consumed in the manufacture of the RFID devices. For example, according to the exemplary embodiment in which a manufacturing process that uses 15-micrometer aluminum foil is altered to make use of 3-micrometer aluminum foil instead, the amount of aluminum used in the manufacture of the RFID antennas may be reduced by 80% or, potentially, more than 80% if it is necessary to construct some parts like strap parts out of thicker aluminum for easier handling.

According to another exemplary embodiment of the present invention, an improved RFID device may be constructed at a reduced cost of production due to reductions in costs other than that which are associated with the amount of the aluminum utilized. For example, the reduced costs of production may be realized due to an interaction on an adhesive with the aluminum material from which the improved RFID device is constructed. More specifically, an appropriate adhesive may be chosen so as to improve the recyclability of the improved RFID device, and therefore make it easier to reclaim the aluminum used in production. According to such an exemplary embodiment, a simpler adhesive other than current UV cured materials such as are used in the art may be used in order to adhere some or all of the RFID antenna, and may have benefits over those UV cured adhesives in terms of their impact on the waste streams. More specifically, a simpler adhesive may be utilized that has a lower impact on the waste streams and that may be easier to remove, thereby making it easier to recycle the aluminum.

Additionally, in some exemplary embodiments, an RFID antenna may be constructed without the use of a patterned adhesive. For example, with respect to the "no-strip" antenna described above, a coating rather than a patterned adhesive may be used. More specifically, a polyvinyl alcohol (PVA) adhesive may be used as a coating, which may in turn permit the coating to eventually biodegrade. Alternatively, other adhesives, such as a starch-based glue, may also be used, which may also allow the coating to eventually biodegrade or may allow the coating to be removed more easily with the use of a particular solvent.

Alternatively, in another exemplary embodiment, it may be desirable to pattern the RFID antenna with a variant form of adhesive other than a UV-cured adhesive. For example, it is contemplated that the RFID antenna may be coated in a particular type of adhesive, such as a starch-based adhesive, thereby allowing the starch-based adhesive to assume a tacky state. In a next step, the no-strip antenna such as is described above may be patterned by printing a negative image of the RFID antenna in an oil, and then following a normal cut-and-strip procedure as is known in the art. In certain exemplary embodiments, it may also be desirable to have some or all of these components be biodegradable. For example, a vegetable-based oil may be used during a patterning process in order to ensure that it is biodegradable.

In another exemplary embodiment of an improved RFID device, a chip used in the RFID device may be varied from an existing chip in order to reduce the chip's impact on a waste stream. For example, a physically smaller chip may be utilized in order to reduce the chip's impact. Alternatively, it may be desirable to make use a physically larger chip if doing so reduces the cost of procuring the chip. For example, it may be easier to realize a cost savings in a set of RFID chips to be installed in RFID tags, as a somewhat larger chip—such as a programmable intelligent computer (PIC) or another such similar chip—may be utilized if it results in costs savings without distorting the overall profile of the RFID device. By comparison, it may be less easy to realize a cost savings in a set of RFID labels, where space may be at more of a premium and it may be desirable to use a lower-profile chip, such as a small 200-micrometer by 400-micrometer silicon chip.

Additionally, RFID devices are now commonly used as part of labels attached to recyclable materials such as cardboard cartons, plastic bottles, fabric items, etc. Unfortunately, the RFID chip is one of the most expensive parts of the construction and also, although it is small, uses energy and some difficult to recycle materials in its construction. Therefore, for both cost and environmental purposes, it would be beneficial to be able to recover and re-use RFID devices when the products that they are attached to are recycled and/or otherwise discarded.

In most current waste streams involving an RFID label or device, the product packaging is collected after disposal and processed in a recycling facility, which produces a reusable product such as paper pulp or plastic pellets. The RFID chip is either incorporated into the output material, thereby acting as a contaminant and reducing the value of the recycled material, or the material is simply disposed of along with the RFID chip.

To address this problem, it is contemplated that, at the recycling stage, the RFID chips can be recovered and returned to the RFID label manufacturer or provider for re-use, thereby preventing the RFID chips from being included in the recycled materials or otherwise discarded. More specifically, the recycling facility may sell the recovered RFID devices/chips to a label manufacturer, thereby making it more cost effective to recycle the overall material and hence increasing recycling rates.

In connection with a near field magnetic strap designed for recycling, the strap is comprised of a loop of conductor that acts as an inductor and resonates with the chip capacitance at a desired frequency. The device may then be packaged by encapsulation the same between two films, such as PET, with an adhesive to prevent moisture ingress. In use, the near field device is then placed near an antenna and couples to it, thereby forming a far field RFID device. As the recycling process typically includes mechanical motion, such as stirring and pulping, the strap is ideally as small as possible, for example of a minimal diameter. Therefore, the line width associated with the loop of conductor is also as small as possible to decrease the overall size of the device.

A modified version of the strap includes an inductor that is comprised of more than one turn. For example, multi-turn coils need the RFID chip to be connected to both the inner and outer end of the conductor, which can be achieved by routing the turns under the chip or by using a secondary bridge conductor, formed as part of a double-sided etched process or as an additive print of a conductive material. The conductor to make the coil can be a metal, such as aluminum foil, or a printed conductive ink. An alternate method of making a reduced diameter strap includes using a relatively high magnetic permeability material in the central region, thereby increasing the coil inductance and hence allowing it to be a smaller diameter.

The present invention also contemplates a filtering system that is designed to isolate the presence of RFID devices in a volume of a waste stream and separate that volume, thereby creating a secondary waste stream with a higher density of RFID devices per unit volume. More specifically, the system uses an RFID reader coupled to a known area of a waste stream, for example a pipe or conveyor, and a method of selectively diverting some of the waste stream. Depending on the nature of the waste stream, different types of RFID antennas and coupling to the RFID can be used. For example, with a liquid waste carrier, such as water, a near field reader antenna would be most suitable. By comparison, a far field RFID antenna may be more appropriate for use with a shredded waste material on a conveyor.

In another alternative embodiment, the RFID loop and chip are encapsulated between two layers of a foam material, thereby making their relative density less than water such that they will float to the top of a tank of water during a recycling process. More specifically, the foam may be compressed as the strap is attached adjacent to the RFID antenna and held in the compressed state by the structure of the RFID label to minimize a visual 'bump' from the uncompressed strap. The strap may then return to its uncompressed state when the RFID label is recycled.

In yet another embodiment of the present invention, a field strap may have a portion of its area occupied by a magnetic material, such as a mild steel. The use of a magnetic material will allow it to be separated using a magnetic field during a recycling process, thereby pulling out the RFID devices from the rest of the recycled materials.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
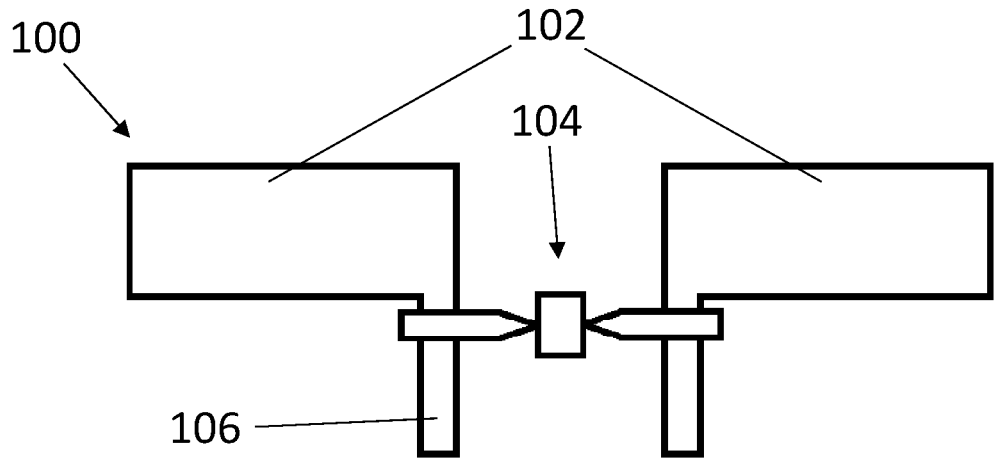
FIG. 1 depicts an exemplary embodiment of an RFID transponder manufactured using a strap, as provided in the prior art.
Figure 2:
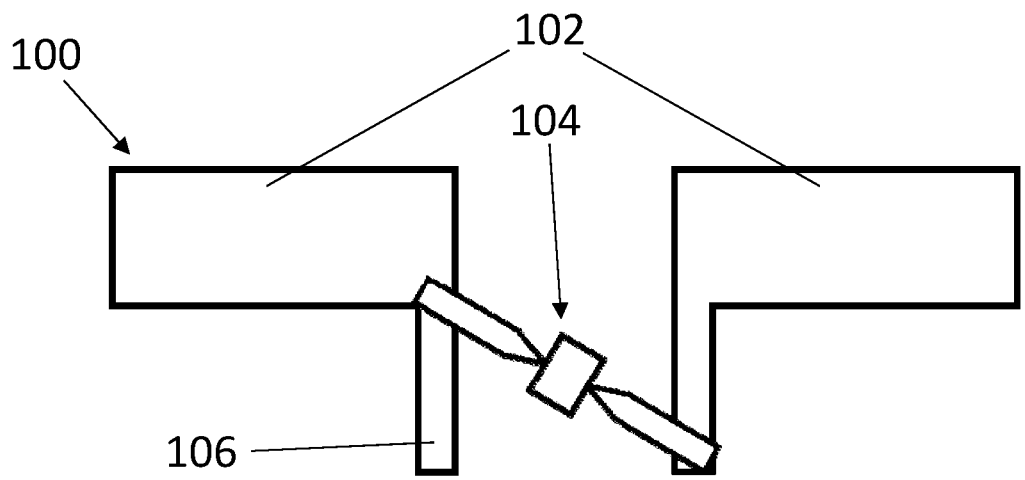
FIG. 2 depicts an exemplary alternative embodiment of an RFID transponder manufactured using a strap, as provided in the prior art.

Referring now generally to the Figures, various exemplary embodiments of improved RFID devices and their methods of manufacturing and possible recycling are disclosed herein. By way of background, FIGS. 1-2 display an exemplary embodiment of a prior art RFID transponder 100 manufactured using a strap 104. The RFID transponder 100 is preferably comprised of a pair of spaced apart connections 102, each having a respective lead 106. According to an exemplary embodiment, strap 104 may be used to facilitate the manufacture of transponder 100 by providing an electrical interface for routing between connections 102, such as a connection associated with a chip and a connection associated with an antenna. More specifically, the strap 104 may be placed over, and extend between, the leads 106 such that, even if the strap 104 is misaligned (as depicted in FIG. 2), it will still create a bridge between the respective leads 106.

Figure 3:
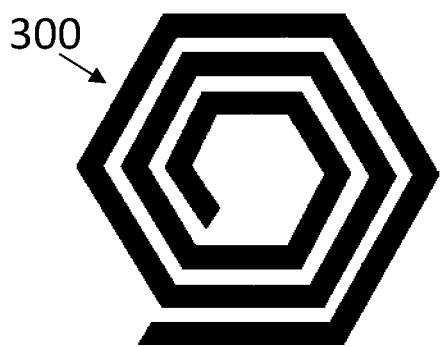
FIG. 3 depicts an exemplary embodiment of a hexagonal coil such as may be used in an exemplary embodiment of an RFID antenna.

FIG. 3 depicts an exemplary embodiment of a hexagonal coil 300, such as may be used in an exemplary embodiment of an RFID antenna. According to an exemplary embodiment, the coil structure 300 may have properties defined by its outer diameter (e.g., a distance between one side and the other), its inner diameter (e.g., the diameter of the inner hole about which the conductive material of the hexagonal coil 300 loops), the width of the coil 300, and the spacing between successive loops of the coil 300. According to an exemplary embodiment, the coil 300 may be arranged or constructed so as to keep material used in the coil 300 at a minimum, which may reduce material costs associated with the manufacturing of the RFID device, and/or may reduce construction costs by permitting more effective and efficient recycling to be performed.

More specifically, and as described above, an improvement to the RFID manufacturing process may be made by removing foil from the manufacturing process, or from the final RFID product, where it is not needed. For example, it may be determined, based on a current map of the RFID device, that there are areas in which removing conductors will have minimal impact on overall performance of the RFID device. Accordingly, an RFID antenna may be designed to have fewer of such areas or to have less material in such areas in order to decrease the amount of material consumed by the manufacturing process and to increase the amount of material that may be recycled as part of production (in the factory) or immediately after production. In one exemplary embodiment, this result may be achieved by "hollowing out" the RFID antenna in order to remove conductive area in the center of the RFID antenna, where the removal of such material will have the least effect on overall device performance. In another exemplary embodiment, a reduction in conductive area may be achieved, in a scenario in which some or all of the conductive area is printed in the form of a solution like silver ink, by reducing the amount of solution used.

According to another exemplary embodiment of the present invention, an antenna type that is best tailored to the intended RFID device may be carefully chosen in order to reduce the amount of material used to manufacture each RFID device, while still keeping the RFID device at an acceptable level of performance. More specifically, RFID antennas may be prepared and manufactured in different shapes, and these shapes may vary by manufacturing run or by intended application, or be based upon any other criteria that suits user need and/or preference. For example, an RFID antenna may be prepared in a shape such that it tessellates more efficiently with other RFID antennas printed on the same sheet, such that more aluminum area can be used to make RFID tags, and less aluminum area is wasted as explained more fully below. While square antennas are typically most common in the art, other shapes, such as triangles, hexagons, or other geometric or non-geometric shapes, may tesselate more efficiently and, as such, said other shapes may be utilized in place of a square shaped antenna in order to save on aluminum area and reduce waste.

Figure 4:
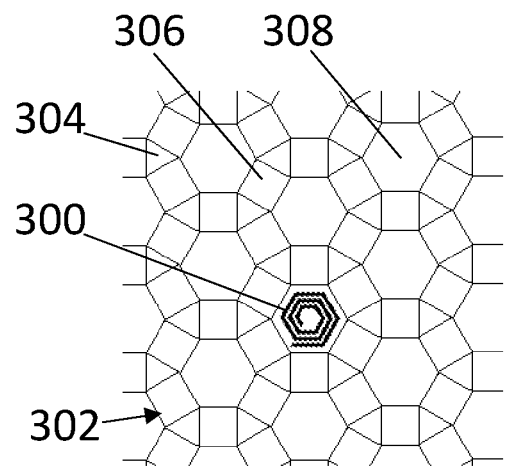
FIG. 4 depicts an exemplary embodiment of a foil sheet prepared with an exemplary tessellation.

FIG. 4 depicts an exemplary embodiment of a foil sheet prepared with an exemplary tessellation 302, which can be generally described as an arrangement of shapes closely fitted together, especially of polygons in a repeated pattern without gaps or overlapping. More specifically, the foil sheet may be prepared with a tessellation 302 featuring any shape or combinations of shapes, such as, for example, triangles 304, squares 306, and regular hexagons 308, one of which is shown as featuring the hexagonal coil 300. In one embodiment, coils 300 may be formed from some or all of the shapes in the tessellation 302, such as may be desired. For example, a square coil may be formed in each square 306 for use in typical RFID antennas (which may most often use a square coil), a triangular coil may be formed in each triangle 304, and a hexagonal coil such as hexagonal coil 300 may be formed in each hexagon 308. Other shapes or combinations of shapes are possible, as well as, for example, coils 300 formed in different shapes than those they are disposed in. For example, it may be desirable to form multiple square coils in a single rectangular shape, if so desired.

In yet another embodiment of the present invention, it may be desirable to have multiple different shapes and/or multiple different sizes of antennas prepared on a sheet so as to fully maximize space, and that an antenna sheet may be tiled with multiple different geometric shapes or multiple different sizes of geometric shapes (or both) in order to maximize spatial efficiency. These antenna shapes may, in some exemplary embodiments, be regular polygons, irregular polygons, or any other geometric or non-geometric shape to suit user preference and that may all be formed on the same sheet so as to increase efficiency and reduce waste. In some exemplary embodiments, it may be understood that, when a mix of RFID antennas are used, such as RFID antennas of different shapes or sizes, the RFID antennas may also be of different types. For example, in some exemplary embodiments, the RFID antennas may use different processes, such as direct and strap attach, as described more fully above.

In a further exemplary embodiment of the present invention, the thickness of the foil used in the manufacturing of the RFID antennas may be varied. By way of example and as noted above, an RFID antenna that is currently manufactured using a 15-micrometer foil may instead be reduced in thickness so as to use a much thinner foil, such as a 3-micrometer foil. The use of a thinner foil may be permissible due to skin depth effects. For example, the RFID signal received by the RFID antenna may be distributed by the antenna such that the induced current density is largest near the surface of the RFID antenna, and decreases with greater depths in the conductor, with the depth being based on the conductor material. As such, even a foil that is substantially reduced in size may be capable of conducting a significant amount of current and receiving signals.

Nonetheless, it will be appreciated by those of ordinary skill in the art that the use of a very thin foil may present other manufacturing challenges, specifically in the field of mechanical handling. For example, it may be impractical to try to deliver or distribute foil having thicknesses below those currently used in the art, and it may be even more impractical to try to use the same to fabricate very small parts because of the high potential of damaging those parts through improper mechanical handling. As such, the use of a thinner foil must typically be coupled with the introduction of an efficient mechanism for handling the thinner foil without damaging the same. According to an exemplary embodiment, the thinner foil may be provided with a paper base in order to thicken the foil parts to allow for easier handling. For example, the foil may be prepared and provided in the form of a roll, with the paper backing running parallel to the foil, such that the parts can be removed from the foil along with the paper backing, and such that the paper backing may be removed once the parts have been applied. Alternative backings and alternative methods of mechanically handling the thin foil of the RFID device are also contemplated. For example, the alternative backings and alternative methods of mechanically handling the thin foil may be used to significantly reduce the amount of aluminum that is consumed in the manufacture of the RFID devices.

In yet a further exemplary embodiment of the present invention, an improved RFID device may be constructed at a reduced cost of production due to reductions in costs other than those associated with the quantity of aluminum utilized. For example, the reduced costs of production may be realized due to an interaction of a particular adhesive with the aluminum material from which the improved RFID device is constructed. More specifically, an appropriate adhesive may be chosen so as to improve the recyclability of the improved RFID device, and therefore make it easier to reclaim the aluminum used in production. The appropriate adhesive may be something other than the UV cured adhesives that are currently used in the art to adhere some or all of the RFID antenna together and to the device, and may have a lower impact on the waste streams and be easier to remove from the device, thereby making it easier to recycle the aluminum.

Figure 5:
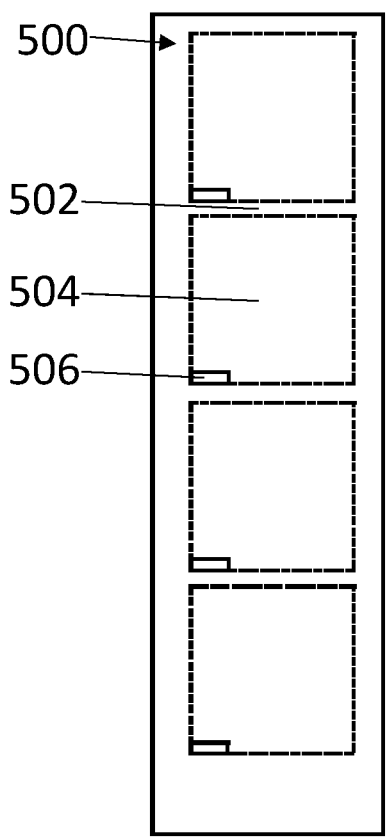
FIG. 5 depicts an exemplary embodiment of an assembly of parts separated by a matrix strip, as provided in the prior art.

FIG. 5 depicts an exemplary embodiment of a prior art assembly of parts 500 separated by a matrix strip 502. In the exemplary embodiment, parts 500 may be formed in the spaces 504 between matrix strips 502, which may be used to separate each part 500. Further, each of spaces 504 between the matrix strips 502 may be further comprised of an alignment mark 506. A reduction in wasted material can also be achieved by better tailoring the printed RFID antennas to the material in question. More specifically, according to an exemplary embodiment, it may be desirable to form RFID antennas on a foil, such that the foil does not require the use of a matrix strip 502 placed between antennas. For example, in one exemplary embodiment, a bar antenna (or an antenna analogous to a bar antenna) may be used. One such analogous antenna, which may hereinafter be referred to as a "no-strip" antenna, may resemble a bar antenna with a T-shape cut out of it and with zero pitch. The use of such an RFID antenna design may ensure that the vast majority of the foil (e.g., close to 100%) is converted to RFID antennas, and that the remainder of the foil can be cleanly recycled, all based on the elimination of the matrix strip 502. It will also be appreciated by those possessing ordinary skill in the art that the strap used to hold the RFID chip to the antenna may also be reclaimed, and, where possible, the RFID chip or silicone could also be recovered and/or recycled.

Figure 6:
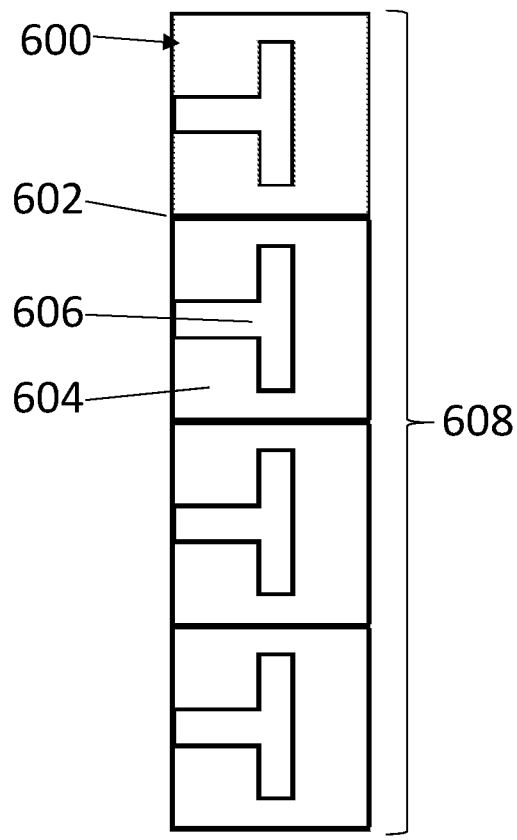
FIG. 6 depicts an exemplary embodiment of an assembly of no-strip antennas.

FIG. 6 depicts an exemplary embodiment of an assembly 600 of no-strip antennas 604, in which antennas 604 may be formed immediately adjacent to one another, such that, apart from the T-shape 606 cut out of each one, the vast majority of the foil is converted to antennas 604. More specifically, the antennas 604 may be formed such that the border 602 of one antenna 604 is shared with the border 602 of the adjoining antenna 604, thereby eliminating the need for a matrix strip 502. In other exemplary embodiments, matrix strip 502 may be disposed on one or more sides of the antennas 604 if so desired. For example, matrix strip 502 may be disposed along the length 608 of the row of antennas 604, such that the T-shape 606 of each row of antennas 604 is linked to the matrix strip 502. This may make it easier to separate the antennas 604 from the T-shape material 606 once the T-shape material 606 is separated from the remainder of the foil, as the use of the matrix strip 502 may ensure that the T-shape material 606 can be removed in one piece. Other configurations of antenna assemblies 600 may also be contemplated, such that, for example, the T-shape 606 of one antenna 604 in the antenna assembly 600 may be a mirror-image of the T-shape 606 of another antenna 604 in the antenna assembly 600, such that the two T-shapes 606 together form a larger I-shape that can be more easily retained after removal.

In some exemplary embodiments, a T-shape 606 may have any size or shape that suits user need and/or preference. For example, according to an exemplary embodiment, a T-shape 606 may be arbitrarily thin, and may involve the removal of very little material. In another exemplary embodiment, T-shape 606 may be arbitrarily large, and may involve the removal of a more substantial degree of material. In some exemplary embodiments, the remaining material may be provided at a set thickness along its entire length. In other exemplary embodiments, the remaining material may have a variable thickness along its length. Other variations on T-shape 606 are also contemplated, and T-shape 606 may not necessarily have to resemble a T. For example, and without limitation, other shapes, such as Y-shapes, may also be used to suit user need and/or preference.

Figure 7:
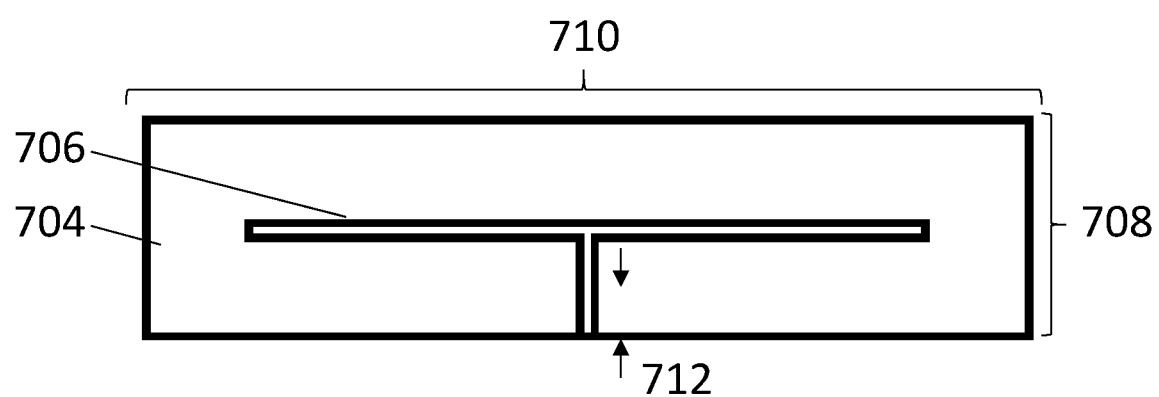
FIG. 7 depicts an exemplary embodiment of a no-strip antenna.

FIG. 7 depicts an alternative exemplary embodiment of a no-strip antenna 704. No-strip antenna 704 is generally bar or rectangularly shaped, and may have a T-shape 706 defined within it which may be removed from the antenna 704 during production. Antenna 704 is preferably comprised of a uniform thickness 712, a height 708, and a width 710, which may define the properties of the antenna 704. It will be generally understood that the larger the area of the antenna 704, the more energy that it will be able to collect and channel towards the RFID chip, and the further read range the RFID device will have.

It may also be understood that, for a bar antenna such as antenna 704, the inductance of the antenna may be defined as $$L = 4\left\{l_b \ln\left(\frac{2A}{a(l_b + l_c)}\right) + l_a \ln\left(\frac{2A}{a(l_a + l_c)}\right) + 2[a + l_c - (l_a + l_b)]\right\}$$

where units are all in centimeters, a is the radius of the wire in centimeters (such that the total thickness of the antenna is 2a), $l_c$ is equal to $\sqrt{(l_a^2 + l_b^2)}$, and A is equal to the area of the coil, $l_a \times l_b$. Other equations may be used to define the properties of antennas having different shapes or variations from bar antenna 704.

Figure 8:
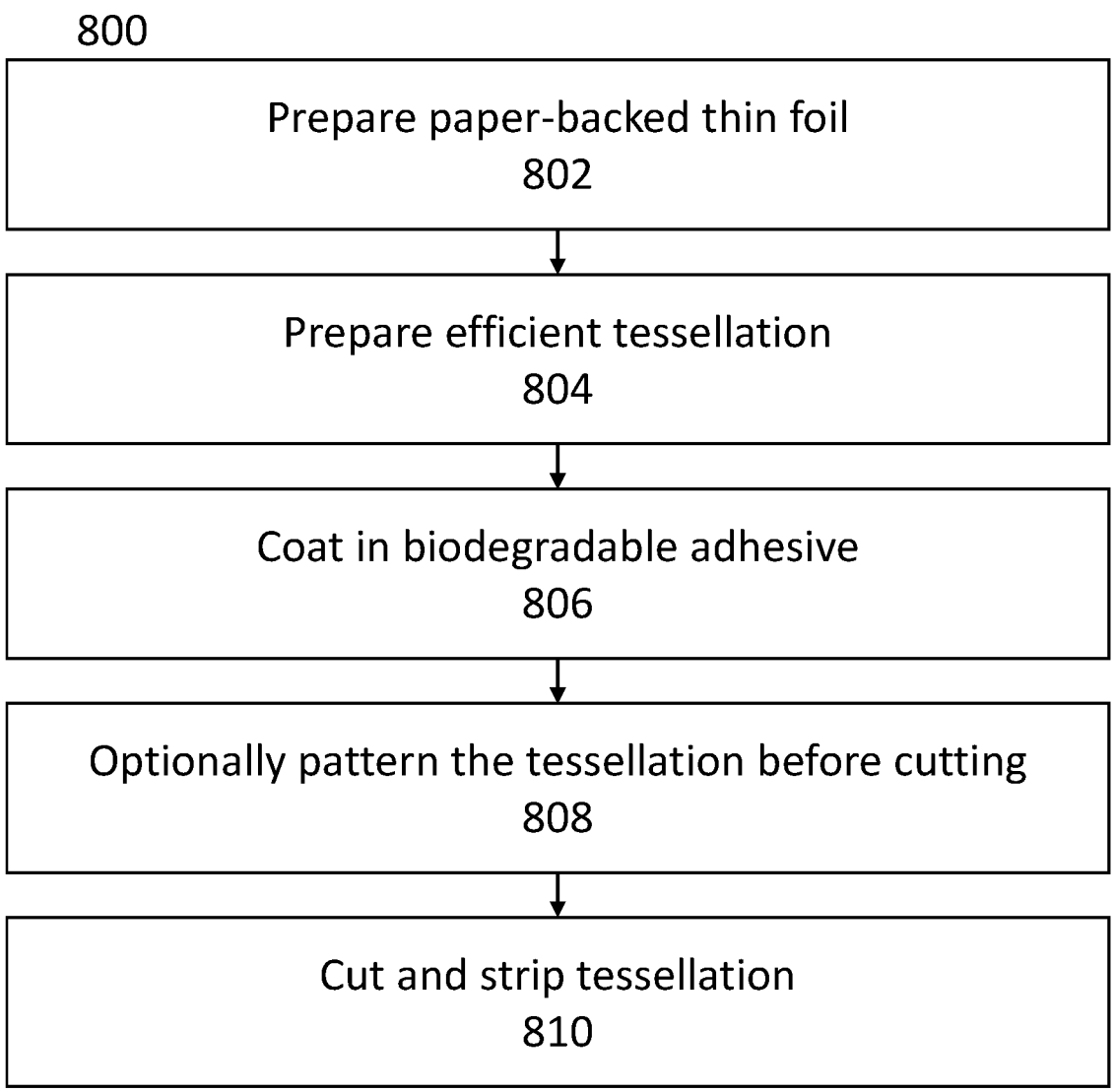
FIG. 8 depicts a flowchart illustrating an improved method of producing an RFID device.

FIG. 8 provides a flowchart depicting an exemplary embodiment of a method 800 for producing improved RFID devices. At step 802, a manufacturer may prepare a paper-backed thin foil, or may otherwise introduce a thin foil into the manufacturing process. At step 804, the manufacturer may then prepare an arrangement of antennas, such as a no-strip arrangement of antennas or another efficient tessellation of antennas, that will eventually be cut out of the thin foil. As stated above, in certain exemplary embodiments, it may also be desirable to have some or all of the RFID device be biodegradable. For example, a vegetable-based oil may be used during a patterning process in order to ensure that it is biodegradable. Accordingly, at step 806 the tessellation of antennas may be coated in a biodegradable adhesive.

In a next step 808, the tessellation may be patterned before cutting, which may involve, for example, printing a negative image in oil over the adhesive coating. However, as stated below, it is not necessary to pattern the tessellation before cutting the same. At step 810, the tessellated foil may then be subjected to a normal cutting and stripping procedure, and the remainder of the RFID manufacturing process may then proceed as is currently understood in the art.

Alternatively, in another exemplary embodiment, it may be desirable to pattern the RFID antenna with a variant form of adhesive other than a UV-cured or biodegradable adhesive. For example, it is contemplated that the RFID antenna may be coated in a particular type of adhesive, such as a starch-based adhesive, thereby allowing the starch-based adhesive to assume a tacky state. Alternatively, in some exemplary embodiments, an RFID antenna may be constructed without the use of a patterned adhesive. For example, with respect to the "no-strip" antenna described above, a coating rather than a patterned adhesive may be used. More specifically, a polyvinyl alcohol (PVA) adhesive coating may be used, which may in turn permit the coating to eventually biodegrade.

Turning now to the recycling opportunities associated with the present invention and by way of background, RFID devices are oftentimes attached to recyclable materials such as cardboard cartons, plastic bottles, fabric items etc. Unfortunately, the chip portion of the RFID device is one of the most expensive parts of the construction of the RFID device, and is oftentimes one of the most difficult to efficiently recycle or remove from the underlying carrier material so that the carrier material may be recycled. Accordingly, it would be beneficial to be able to recover and re-use the RFID devices when the product that it is attached to is recycled and/or otherwise discarded.

In most current waste streams involving an RFID device, the product packaging is collected after disposal and processed in a recycling facility, which produces a reusable product such as paper pulp or plastic pellets. Unfortunately, the RFID chip is either incorporated into the output material, thereby acting as a contaminant and reducing the value of the recycled material, or the material is simply disposed of along with the RFID chip due to the expense and time associated with separating the two. Therefore, there is a long felt need in the art to be able to recover the RFID devices and/or chips at the recycle stage, and return the same to the RFID manufacturer or provider for re-use. More specifically, a recycling facility may sell the recovered RFID devices/chips to a label manufacturer, thereby making it more cost effective to recycle the overall material and hence increase recycling rates.

In one possible embodiment of the present invention, a near field magnetic strap that is designed for recycling is comprised of a loop of conductor that acts as an inductor, and resonates with the chip capacitance at a desired frequency. The device may then be packaged by encapsulating the same between two films, such as PET, with an adhesive to prevent the introduction of moisture. In use, the near field device is then placed near an antenna and couples to it, thereby forming a far field RFID device. As the recycling process typically includes mechanical motion, such as stirring and pulping, the size of both the strap and the line width associated with the loop should be as small as possible to decrease the overall size of the device.

A modified version of the strap may further include an inductor that is comprised of more than one turn. For example, multi-turn coils require that the RFID chip be connected to both the inner and outer end of the conductor, which can be achieved by routing the turns under the chip or by using a secondary bridge conductor, formed as part of a double-sided etched process or as an additive print of a conductive material. The conductor used to make the coil can be comprised of a metal, such as aluminum foil, or a printed conductive ink. An alternate method of making a reduced diameter strap includes using a relatively high magnetic permeability material in the central region, thereby increasing the coil inductance and hence allowing it to be a smaller diameter.

The present invention also contemplates a filtering system that is designed to isolate the presence of RFID devices in a volume of a waste stream, and separate that volume to create a secondary waste stream with a higher density of RFID devices per unit volume. More specifically, the filtering system may comprise a RFID reader coupled to a known area of a waste stream, for example a pipe, and a method of selectively diverting a select portion of the waste stream. Depending on the nature of the waste stream, different types of RFID antennas and coupling to the RFID device can be used. For example, with a liquid carrier such as water, a near field reader antenna would be most suitable. By comparison, a far field RFID antenna may be more appropriate for use with a shredded material moving along a conveyor.

In another alternative embodiment, the RFID loop and chip are encapsulated between two layers of a foam material, thereby making their relative density less than water such that they will float to the top of a tank of water during a recycling process. More specifically, the foam may be compressed as the strap is attached adjacent to the RFID antenna and held in the compressed state by the structure of the RFID label to minimize a visual 'bump' from the uncompressed strap. The strap may then return to its uncompressed state when the RFID label is recycled.

In yet another embodiment of the present invention, a field strap may have a portion of its area occupied by a magnetic material, such as a mild steel. The use of a magnetic material will allow it to be separated using a magnetic field during a recycling process, thereby pulling out the RFID devices from the rest of the recycled materials.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of improving efficiency of a manufacturing process for a radio frequency identification (RFID) device, the method comprising:
    mapping, via a processor, the RFID device to determine a first design of the RFID device;
    identifying, via a processor and based on the mapping, a portion of the first design that can be removed without materially altering a performance characteristic of the RFID device; and
    defining, via a processor, a second design which eliminates the portion, the second design for use in subsequent manufacturing of the RFID device.

2. The method of claim 1, wherein the defining comprises hollowing out the portion in the second design as compared to the first design.

3. The method of claim 2, wherein the hollowing out comprises using less manufacturing material in the second design at an area near a center of an RFID antenna than was used in the first design.

4. The method of claim 1, wherein the defining comprises eliminating manufacturing material, from the first design, in an area near a center of an RFID antenna.

5. The method of claim 4, wherein the manufacturing material is a conductive foil.

6. The method of claim 5, wherein the defining comprises changing a thickness of the conductive foil.

7. The method of claim 4, wherein the manufacturing material is a conductive ink.

8. The method of claim 7, wherein the defining comprises reducing an amount of the conductive ink.

9. The method of claim 4, wherein the defining comprises changing one of a shape and a form factor of the RFID antenna in the second design as compared to the first design.

10. The method of claim 1, wherein the portion is a conductor.

* * * * *